United States Patent [19]
DeYoung

[11] 3,756,117
[45] Sept. 4, 1973

[54] SPOOL HOLDER DRIVE MECHANISM
[75] Inventor: Simon Arden DeYoung, Ravenna, Ohio
[73] Assignee: Karg Machine Products, Inc., Tallmadge, Ohio
[22] Filed: Jan. 3, 1972
[21] Appl. No.: 214,656

[52] U.S. Cl. .............................. 87/29, 87/33, 87/46
[51] Int. Cl. ............................................. D04c 3/12
[58] Field of Search ..................... 87/29, 30, 33, 44, 87/45, 46

[56] References Cited
UNITED STATES PATENTS

| | | | |
|---|---|---|---|
| 458,470 | 8/1891 | Lombard | 87/18 |
| 573,411 | 12/1896 | Hilton | 87/33 |
| 642,977 | 2/1900 | Groupe | 87/45 |
| 681,450 | 8/1901 | Groupe | 87/45 |
| 695,746 | 3/1902 | Lundgren | 87/18 |
| 814,711 | 3/1906 | Larsson | 87/45 |
| 858,735 | 7/1907 | Lundgren | 87/45 |
| 1,144,716 | 6/1915 | Lundgren | 87/45 |
| 1,409,298 | 3/1922 | Horn et al. | 87/45 |
| 2,469,047 | 5/1949 | Loader | 87/29 |
| 2,672,071 | 3/1954 | Marogg | 87/46 |
| 3,099,932 | 8/1963 | Ege et al. | 87/29 X |

FOREIGN PATENTS OR APPLICATIONS
109,180 9/1917 Great Britain

Primary Examiner—John Petrakes
Attorney—Mack D. Cook, II

[57] ABSTRACT

Spool holder drive mechanism for a rotary braiding machine wherein sets of spool holders are moved along circular paths in opposite directions relative to a "work center" toward which tensioned strands from spools on the holders are directed. The drive mechanism includes a stationary sun gear and a rotatable support plate mounted in axial alignment adjacent the "work center" of the strand fabricating machine. The support plate mounts the base holders for the inner spool holders and carries a guideway for movement of a set of outer spool holders. Rotation of the support plate in relation to the sun gear is transmitted through sets of planet gears to the base holders for the inner spool holders.

4 Claims, 6 Drawing Figures

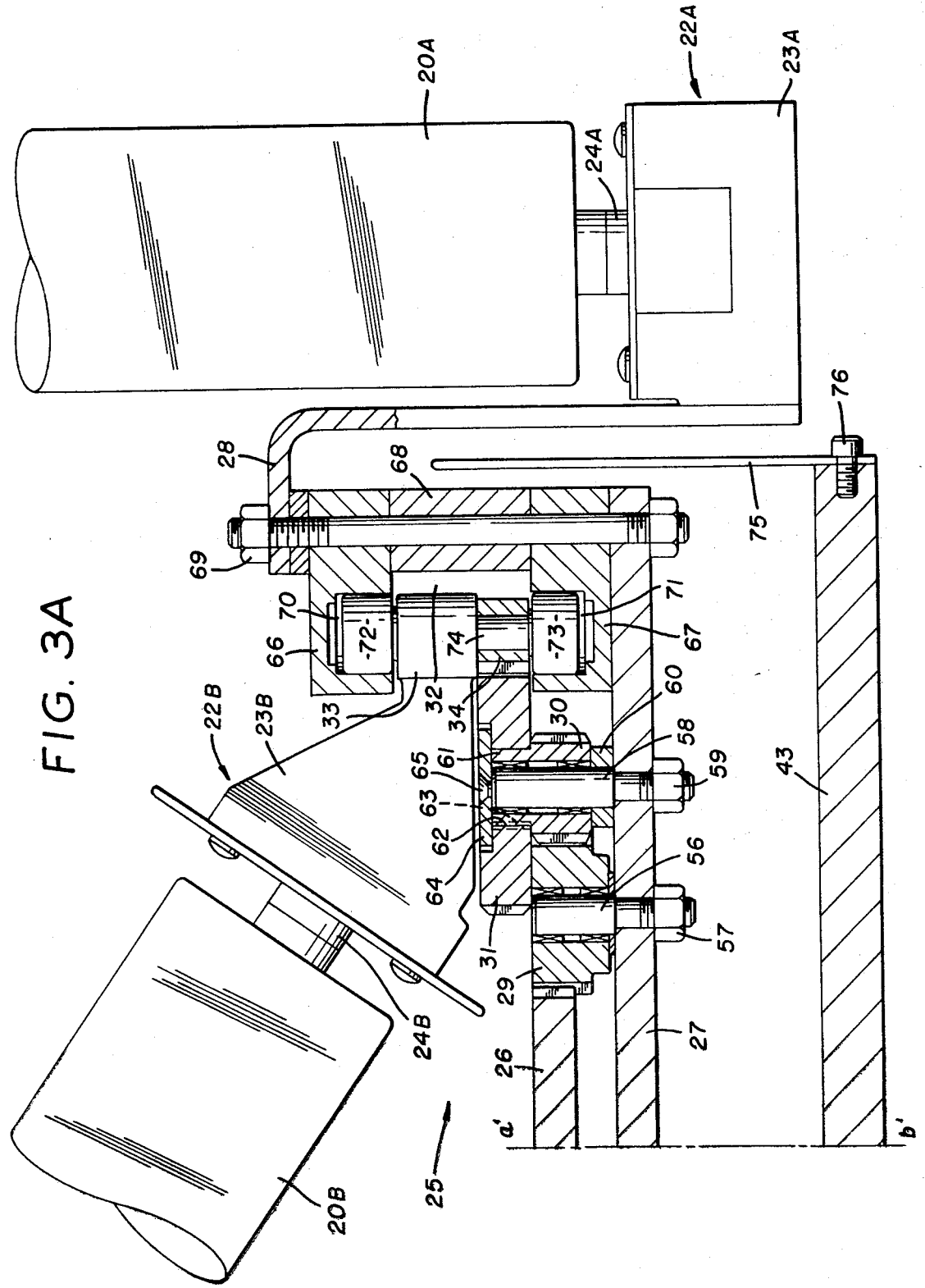

TABLE OF GEAR DIAMETER FOR 1:1 RATIO BETWEEN INSIDE CARRIERS AND OUTSIDE BOBBIN SUPPORT

| DIA. SUN GEAR (26) | DIA. SEGMENTAL RING GEAR (34) | DIA. 2ND (30) PLANET GEAR | DIA. 3RD (31) PLANET GEAR |
|---|---|---|---|
| 40" | 48" | 1 1/4" | 3" |
| 32" | 36" | 1 1/3" | 3" |
| 20" | 24" | 5/6" | 2" |
| 18" | 24" | 3/4" | 2" | to a third planet gear. The support plate also has a circular guideway for the support of a second set of baseholders for the mounting of an inner set of spool holders. The second set of baseholders each carry a radially inwardly facing arcuate gear segment for meshing with the third set of planet gears. The length of each baseholder gear segment is greater than the distance between axes of adjacent third planet gears. That is, the distance between the meshing point of a baseholder gear segment with any two third planet gears is less than the length of the gear segment.

In the drive mechanism as described herein, various gear sets may be used. In any event, the pitch diameter of the sun gear and the planet gears may be such as to produce a 1:1 ratio of movement of the outer spool holders relative to the inner spool holders.

DESCRIPTION OF THE DRAWINGS

FIG. 3A is a fragmentary view in section of the spool holder drive mechanism to be considered in conjunction with FIG. 3;

DETAILED DESCRIPTION OF THE INVENTION

Figure 1:
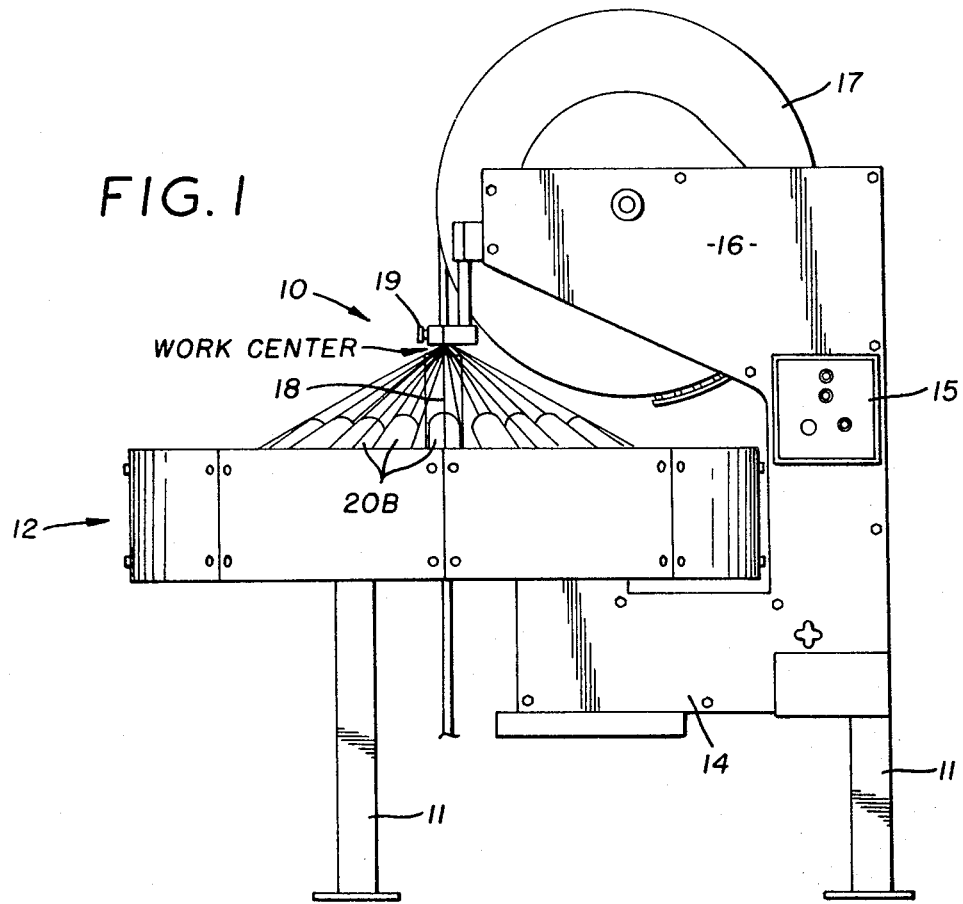
FIG. 1 is a side view of a rotary braiding machine having thereon the spool holder drive mechanism according to the invention.
Figure 2:
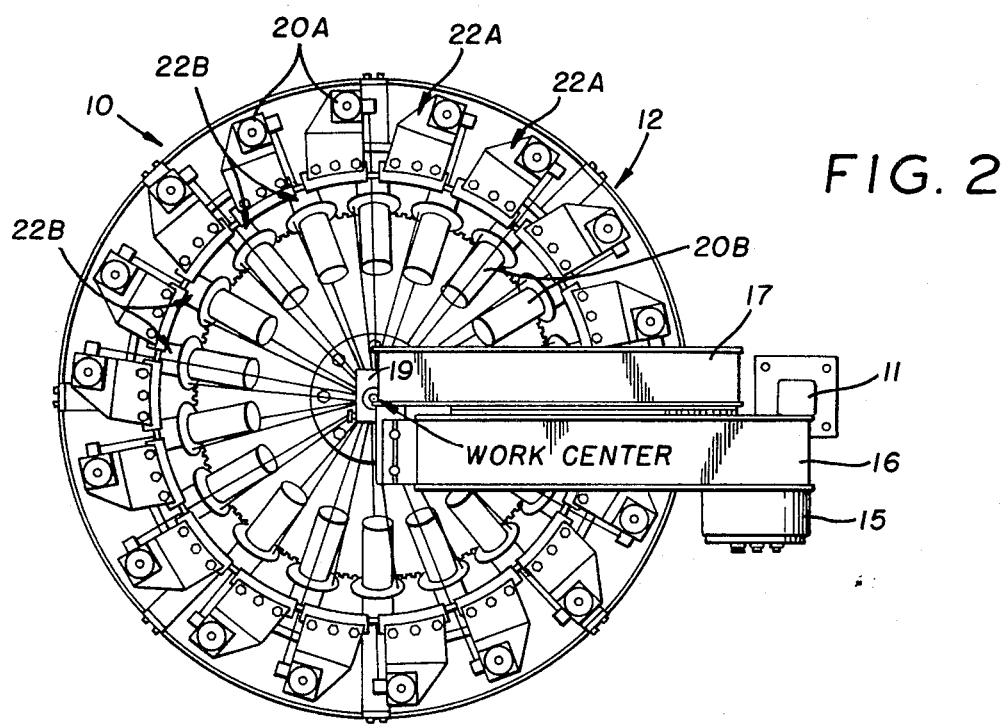
FIG. 2 is a plan view of the rotary braiding machine of FIG. 1.

Referring to FIGS. 1 and 2, a rotary braiding machine is indicated generally by the numeral 10. As shown, the braiding machine 10 is operating in a vertical plane although the machine 10 could be operated in a horizontal or an inclined plane.

The braiding machine 10 has a structural frame with support member 11 for floor mounting. The machine 10 includes a braiding mechanism indicated generally by the numeral 12, a drive motor housing 14, a control box 15, a capstan support housing 16, a capstan 17, an interior braiding point retainer 18, and an exterior braiding point retainer 19. The "work center" of the machine 10 is in the area between the retainers 18 and 19.

The braiding mechanism 12 includes the spool holder drive mechanism according to the invention and indicated generally by the numeral 25. The drive mechanism 25 actuates relative movement of a set of outer spools 20A and a set of inner spools 20B. A material strand from each spool 20A and 20B is let off toward the "work center." The strands are subjected to tension by the capstan 17 and are braided as to each other or around a core member introduced coaxially of the braiding mechanism 12.

As best shown in FIG. 3A, an outer spool 20A is carried by a spool holder indicated generally by the numeral 22A and having a base 23A. An inner spool 20B is carried by a spool holder indicated generally by the numeral 22B and having a base 23B. The spool holder bases 23A and 23B house therein suitable mechanisms (not shown) for controlling rotation of spool spindles 24A and 24B. Te spool holders 22A and 22B also have suitable mechanisms (not shown) for strand tension-controlling and actuation of spool release. For such further details as are necessary to understand the operation of these mechanisms, reference may be made to the related U.S. Pat. application Ser. No. 193,128 filed Oct. 27, 1971.

A drive mechanism 25 includes a stationary sun gear 26 and a rotatable support plate 27 mounted in axial alignment adjacent the "work center" of a machine 10. The sun gear 26 is between the support plate 27 and the "work center."

The support plate 27 is driven by the drive motor in housing 14 and carries a first set of baseholders 28 for mounting of the outer set of spool holders 22A. The support plate 27 also carries sets of rotatably mounted and meshing first planet gears 29 and second planet gears 30. Each planet gear 29 meshes with the sun gear 26. Each planet gear 30 is axially coupled to a third planet gear 31.

The support plate 27 also has a circular guideway 32 for the support of a second set of baseholders 33 for mounting of the inner set of spool holders 22B. Each baseholder 33 carries a radially inwardly facing gear segment 34 for meshing with the planet gears 31.

Figure 3:
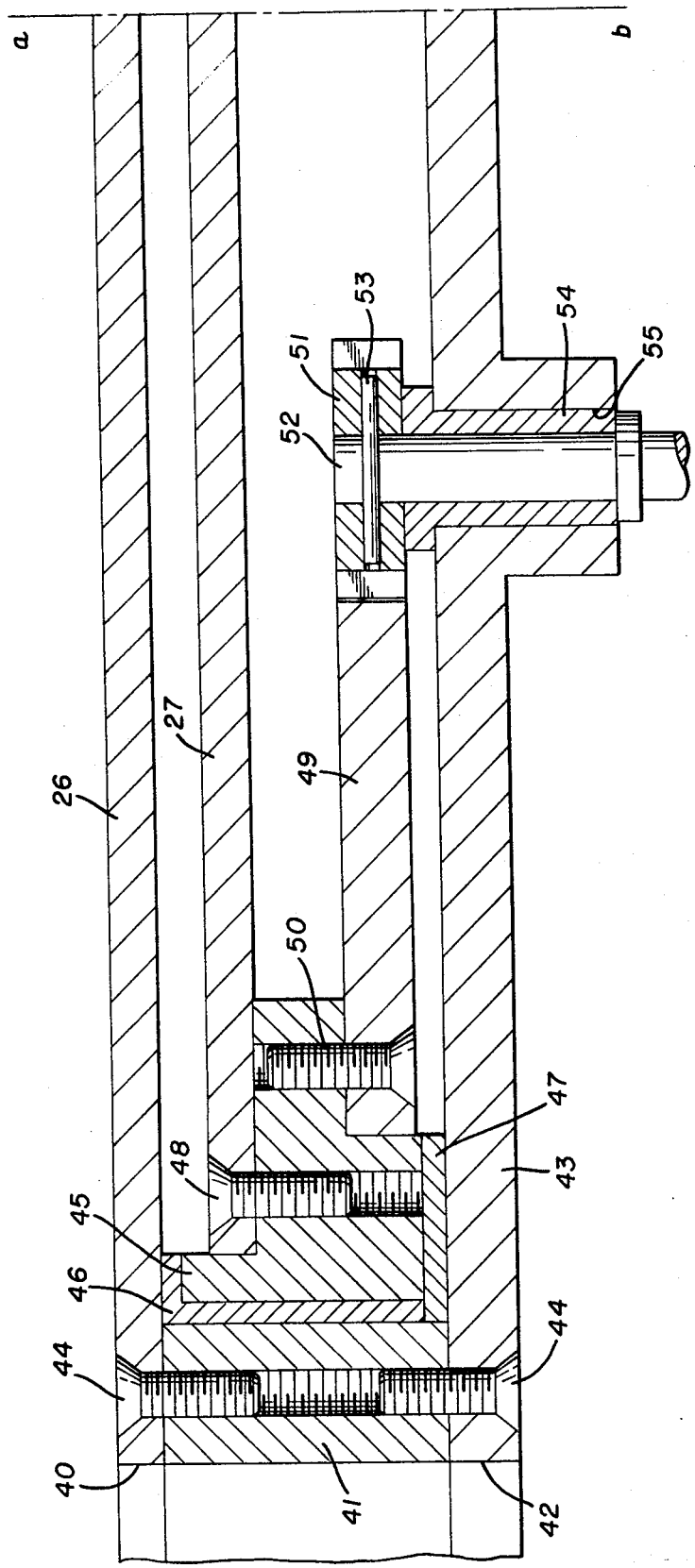
FIG. 3 is a fragmentary view in section of the spool holder drive mechanism according to the invention to be considered in conjunction with FIG. 3A.

As shown in FIG. 3, the sun gear 26 may be an annular element with an axial bore 40 aligned with an annular spacer 41 and axial bore 42 in a drive support plate 43. The sun gear 26, spacer 41 and drive support plate 43 may be assembled as a unitary structure as by fastening means 44.

Also as shown in FIG. 3, the support plate 27 is rotatably mounted in the area between the sun gear 26 and the drive support plate 43 as by a hub element 45 rotatable on bushing surfaces 46 and 47. The plate 27 is attached to one face of the hub element 45 as by fastening means 48. The opposite face of the hub element 45 carries a drive gear 49 attached thereto as by fastening means 50. The drive gear 39 meshes with a smaller gear 51, carried on the end of a power shaft 52 and attached thereto as by fastening means 53. The power shaft 52 rotates in a bushing 54 inserted in a bore 55 through the drive support plate 43. The power shaft is suitably connected by means (not shown) to a motor in the housing 14.

As shown in FIG. 3A, each planet gear 29 is bearing mounted on a stud 56 projecting from the support plate 27 and attached thereto as by fastening means 57. Each planet gear 30 is bearing mounted on a stud 58 projecting from the support plate 27 and attached thereto as by fastening means 59. The distance between the studs 58 is less than the length of a gear segment 34. That is, the effective length of each gear segment 34 is greater than the distance between axes of adjacent third planet gears 31.

Each gear 30 is positioned for meshing engagement with an adjacent gear 29 as by a spacer 60. Each gear 30 also has a hub portion 61 inserted within a bore 62 in a planet gear 31. Each adjacent gear 30 and 31 are axially coupled as by a key means 63. A keeper plate 64 may be attached to a stub 58 as by a fastening means 65 to maintain each set of gears 29, 30 and 31 in position on the support plate 27.

Also as shown in FIG. 3A, the guideway 32 for the inner spool holders 22B is formed by sets of opposed arcuate plates 66 and 67 separated by a spacer block 68 and attached to the support plate 27 as by fastening

SPOOL HOLDER DRIVE MECHANISM

CROSS-REFERENCE TO RELATED APPLICATIONS

The subject matter of this invention is related to the subject matter of co-pending U.S. Pat. application Ser. No. 193,128 filed Oct. 27, 1971.

BACKGROUND OF THE INVENTION

Rotary braiding machines utilizing the present invention have sets of spool holders which are moved along circular paths in opposite directions relative to the "work center" of the machine toward which tensioned strands from the spools are directed. The tensioned strands may be braided as to each other or around a core member.

A prior art rotary braiding machine is disclosed in U. S. Pat. No. 1,032,870, July 1912. This prior art machine, often referred to as a "Wardwell" braiding machine, has a base mounted upon a floor supported bed. Turrets or heads are revolvable in opposite directions upon the base and carry spools of strand material. Strands of material from the spools are led to the "work center" under tension supplied by a capstan. Improvements in the drive mechanism for a "Wardwell" machine are disclosed in U. S. Pat. No. 2,190,169, Feb. 1940.

The prior art rotary braiding machines typified by the above referenced "Wardwell" patents performed well so long as the operational speeds were low, labor was available to maintain continual and correct adjustment and to perform adequate mainten-ance, and a high noise level of operation could be tolerated.

The art relating to rotary braiding also includes a machine as typified by U. S. Pat. No. 1,796,938, Mar. 1931. This prior art patent discloses a "Petersen" or "Boston Braider" machine that was apparently developed to braid fabric around high pressure hose or electrical cable. The machine has a drive mechanism wherein opposed annular gears are pinion driven to rotate in opposite directions around and relative the "work center" of the strand fabricating machine. One of the annular gears drives a member supporting three concentric annular rotary members. The center rotary member carries a first set of spool holders. The other two rotary members, positioned radially inner and outer of the center member, have opposed guideways for guiding movement of a second set of spool holders. Power transmitted through the other annular gear causes a "pusher" device to move the second set of spool holders in a direction opposite to movement of the first set of spool holders.

To the inventors knowledge, machines of the type as disclosed in U. S. Pat. No. 1,796,938, were never put into commercial use although improvements thereon are disclosed in U. S. Pat. No. 2,506,315, May 1950. Nevertheless, it is thought that most or all of the disadvantages of the Wardwell braiding machines would also be present in a "Petersen" machine.

The art relating to rotary braiding further includes machines as typified in U. S. Pat. No. 1,801,134, April 1931. This machine has a deck plate with sinuous or serpentine intersecting guideways for directing spool holders in opposite direction around and relative to the "work center." The spool holders have driving lugs for engagement in slots in oppositely rotating horn gears, upper and lower foot plates for engaging opposite faces of the deck plate and elongated heart pieces connecting the foot plates and interfitting in the guideways. The guideways are arranged to coact with the heart pieces to maintain the carriers in predetermined relationship to the braiding point and cause transfer of the driving lugs from a slot in one horn gear to a slot in the adjacent horn gears.

The rotary braiding machines of U. S. Pat. No. 1,801,134, have been improved over the years. Nevertheless, the limitations as to the spool diameter, low speed of operation and high noise level of operation have remained as primary disadvantages of the horn gear-deck plate type of machine.

The art relating to rotary braiding still further includes gear driven machines as disclosed in U. S. Pat. No. 3,362,283, January 1968. Nothing is known as to the commercial success of machines constructed in accordance with U. S. Pat. No. 3,362,283. In general, this patent does disclose a stationary inner table (28) positioned coaxially of the machine and an outer table (15) concentric to and rotatable about the inner table. Concentrically disposed gear segments (28) are mounted for circular sliding movement around the inner table. Te inner spool holders (19) are supported by the gear segments. The rotatable outer table has axles (31) connected by pinions (30, 37 & 38) to the outer spool holders (20). A drive means is operably related to the gear racks and the outer table for rotational movement of the inner and outer spool holders.

SUMMARY OF THE INVENTION

It is an object of the present invention to provide an improved spool holder drive mechanism for a rotary braiding machine wherein sets of spool holders are moved along circular paths in opposite directions relative to a "work center" toward which tensioned strands from spools on the holders are directed.

It is an object to provide a spool holder drive mechanism having a simplified construction with fewer parts to provide precise and regulated relative movement of sets of spool holders.

Still further, it is an object to provide a spool holder drive mechanism which is not subject to excessive wear of the component elements, which will have a high speed of operation, which will have a low noise level of operation, and with component elements protected from or not susceptible to abusive or intentional damage.

These and other objects of the invention, and the advantages thereof, will be apparent in view of the Detailed Description of the Invention as set forth below.

In general, a drive mechanism for a rotary braiding machine according to the invention causes sets of spool holders to move along circular paths in opposite directions relative to a "work center" toward which tensioned strands from spools on the holders are directed.

The drive mechanism according to the invention has a stationary sun gear and a rotatable support plate mounted in axial alignment adjacent the "work center." The sun gear is between the support plate and the "work center."

The support plate is driven from a power source and carries a first set of baseholders for the mounting of an outer set of spool holders. The support plate also carries sets of rotatably mounted and meshing first and second planet gears. Each first plane gear meshes with the sun gear. Each second planet gear is axially coupled means 69. Each plate 66 and 67 has opposed and aligned channels 70 and 71. Each base holder 33 has two sets of rollers 72 and 73 carried on shafts 74 for seating in and movement along the channels 70 and 71.

As further shown in FIG. 3A, the baseholder 28 may be attached to the support plate 27 as by the fastening means 69. Between each baseholder 28 and the support 27, the drive support plate 43 may carry a strand deflector 75 attached thereto as by fastening means 76.

Rotation of the support plate 27 in relation to the sun gear 26, via the power transmission train of shaft 52, gear 51 and gear 49, will move the baseholders 28, the spool holders 22A and the spools 20A in one circular direction within the braiding mechanism 12. Concurrently, each set of planet gears 29, 30 and 31 will transmit power to the arcuate gear segments 34 to move the base holders 33, the spool holders 22B and the spool 20B in the opposite circular direction.

Figures 4, 5:
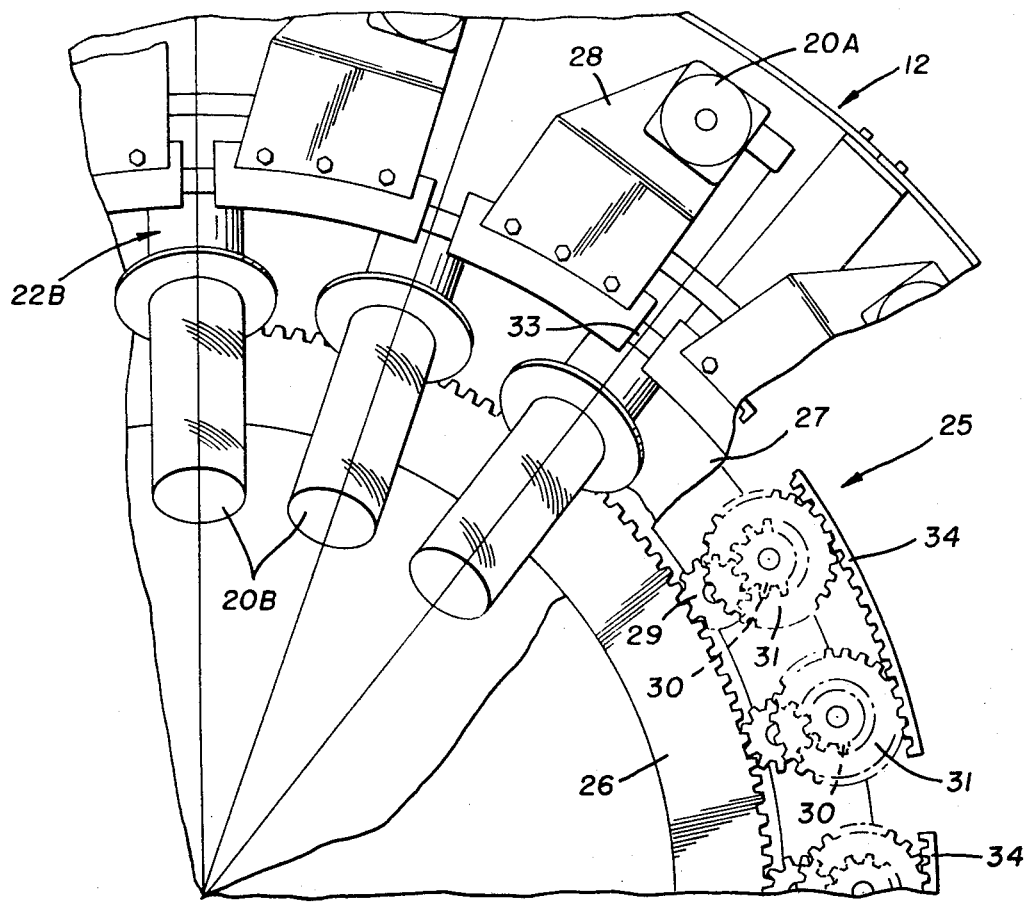
FIG. 4 is a fragmentary plan view, partially broken away, showing components of the spool holder drive mechanism according to the invention.
FIG. 5 is a tabulation of representative gear sets for a drive mechanism according to the invention.

If it is desired to provide a 1:1 ratio for relative movement of the spools 20A and 20B to each other, FIG. 5 contains a tabulation of representative pitch diameters for the sun gear 26, segmental ring gears 34, second planet gears 30 and third planet gears 31. Other ratios of relative movement may be provided by a mechanical engineer who has had the benefit of the foregoing disclosure. It is possible to achieve a relative movement of the spools 20A and 20B in the ratios 1:0.5 to 1:2.0.

What is claimed is:

1. A spool holder drive mechanism for a rotary braiding machine wherein sets of spool holders are moved along circular paths in opposite directions relative to a "work center" toward which tensioned strands from spools on the holders are directed, characterized in that, a stationary sun gear and a rotatable support plate are mounted in axial alignment adjacent said "work center," said sun gear being between said support plate and the "work center,"

said support plate being driven from a power source and carrying a first set of baseholders for the mounting of an outer set of spool holders, said support plate also carrying sets of rotatably mounted and meshing first and second planet gears, each first planet gear meshing with said sun gear, each second planet gear being axially coupled to a third planet gear, said support plate also having a circular guideway for the support of a second set of baseholders for the mounting of an inner set of spool holders, each of said second set of baseholders carrying a radially inwardly facing arcuate gear segment for meshing with said third set of planet gears.

2. A spool holder drive mechanism according to claim 1,
further characterized in that,
the length of each said baseholder gear segment is greater than the distance between the axes of adjacent third planet gears.

3. A spool holder drive mechanism according to claim 1,
further characterized in that,
the distance between the meshing point of a baseholder gear segment with any two third planet gears is less than the length of said gear segment.

4. A spool holder drive mechanism according to claim 1,
further characterized in that,
the pitch diameter of said sun gear and said planet gears may be such as to provide a relative movement of said outer spool holders to said inner spool holders in the ratios 1:0.5 to 1:2.0.

* * * * *